(12) United States Patent
Ohmura

(10) Patent No.: US 11,173,902 B2
(45) Date of Patent: Nov. 16, 2021

(54) VEHICLE CONTROL DEVICE

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 191 days.

(21) Appl. No.: 16/614,392

(22) PCT Filed: May 29, 2018

(86) PCT No.: PCT/JP2018/020465
§ 371 (c)(1),
(2) Date: Nov. 18, 2019

(87) PCT Pub. No.: WO2018/225575
PCT Pub. Date: Dec. 13, 2018

(65) Prior Publication Data
US 2020/0180618 A1 Jun. 11, 2020

(30) Foreign Application Priority Data
Jun. 6, 2017 (JP) .............................. JP2017-111762

(51) Int. Cl.
*B60W 30/12* (2020.01)
*B60W 30/09* (2012.01)
*B60W 50/12* (2012.01)

(52) U.S. Cl.
CPC ............ *B60W 30/12* (2013.01); *B60W 30/09* (2013.01); *B60W 50/12* (2013.01)

(58) Field of Classification Search
CPC combination set(s) only.
See application file for complete search history.

(56) References Cited

U.S. PATENT DOCUMENTS

| | | | |
|---|---|---|---|
| 8,473,144 B1* | 6/2013 | Dolgov | B60W 30/18163 701/28 |
| 2021/0146954 A1* | 5/2021 | Kaji | B60W 50/14 |

FOREIGN PATENT DOCUMENTS

| | | |
|---|---|---|
| JP | 2010006334 A | 1/2010 |
| JP | 2014142965 A | 8/2014 |
| JP | 2016038837 A | 3/2016 |

OTHER PUBLICATIONS

International Preliminary Report on Patentability and Written Opinion issued in PCT/JP2018/020465; dated Dec. 10, 2019.

(Continued)

*Primary Examiner* — Jeff A Burke
*Assistant Examiner* — Zachary Joseph Wallace
(74) *Attorney, Agent, or Firm* — Studebaker & Brackett PC

(57) ABSTRACT

A vehicle control device (ECU) 10 is configured to, when there is an obstacle 3 in a lane 7, execute traveling course correction processing (S15) of setting a speed distribution zone 40 defining a distribution of an allowable upper limit $V_{lim}$ of a relative speed of the vehicle 1 with respect to the obstacle 3, and calculate a corrected target traveling course Rc by correcting a target traveling course R so as to prevent the relative speed of the vehicle 1 from exceeding the limit $V_{lim}$ and enable the vehicle 1 to avoid the obstacle 3. The traveling course correction processing includes restriction processing (S27) of calculating the corrected target traveling course (restricted target travel courses Rc1_r through Rc3_r) such that a lateral avoidance distance (L2_r, L3_r) thereof is restricted to be smaller when a border line of the lane 7 is not detected.

4 Claims, 9 Drawing Sheets

(56) References Cited

OTHER PUBLICATIONS

International Search Report issued in PCT/JP2018/020465; dated Aug. 7, 2018.
Office Action issued in JP 2017-111762; mailed by the Japanese Patent Office dated Dec. 3, 2018.

* cited by examiner

FIG.2

| Driving Support Mode | Detection of Lane | Detection of Preceding Vehicle | Target traveling course |
|---|---|---|---|
| Preceding Vehicle Following | Detectable | — | 1st traveling course (setup vehicle speed, ideal course) |
| | Undetectable | Detectable | 2nd traveling course (vehicle speed of preceding vehicle, trajectory of preceding vehicle) |
| | | Undetectable | 3rd traveling course (based on current traveling behavior) |
| Automatic Speed Control | — | — | 3rd traveling course (based on current traveling behavior) |
| Speed Limiting | — | — | 3rd traveling course (based on current traveling behavior) |
| Basic Control | — | — | 3rd traveling course (based on current traveling behavior) |

VEHICLE CONTROL DEVICE

TECHNICAL FIELD

The present invention relates to a vehicle control device, and more particularly to a vehicle control device for supporting safety traveling of a vehicle.

BACKGROUND ART

There have been proposed various vehicle driving support techniques regarding lane departure prevention. In the following Patent Document 1, there is described a technique of, particularly in a situation where one of opposed demarcation lines of a lane is undetectable, setting a virtual demarcation line, and executing driving support such as lane departure prevention.

CITATION LIST

Parent Document

Patent Document 1: JP 2014-142965A

SUMMARY OF INVENTION

Technical Problem

However, for example, when a time period during which the demarcation line is undetectable becomes longer, the reliability of the virtual demarcation line becomes lower. Thus, there is a problem that, when avoiding an obstacle (e.g., parked vehicle) in a traveling lane (a lane along which a vehicle is traveling), the vehicle is likely to cross an actual demarcation line and depart from the lane.

The present invention has been made to solve such a problem, and an object thereof is to provide a vehicle control device capable of suppressing lane departure during obstacle avoidance, even in a situation where a border line of a traveling lane is undetectable.

Solution to Technical Problem

In order to achieve the above object, the present invention provides a vehicle control device for setting a target traveling course in a lane along which a vehicle is traveling, wherein: the target traveling course includes sets of a target position and a target vehicle speed; and the vehicle control device is configured to, when there is an obstacle in the lane, execute traveling course correction processing of setting, between the obstacle and the vehicle, a speed distribution zone defining a distribution of an allowable upper limit of a relative speed of the vehicle with respect to the obstacle, and calculating a corrected target traveling course by correcting the target traveling course so as to prevent the relative speed of the vehicle from exceeding the allowable upper limit and enable the vehicle to avoid the obstacle, wherein the traveling course correction processing includes restriction processing of calculating the corrected target traveling course such that a lateral avoidance distance of the corrected target traveling course with respect to the target traveling course is restricted to be smaller when a border line of the lane is not detected than when the border line of the lane is detected.

In the vehicle control device of the present invention having the above feature, when a border line of the lane is not detected, the lateral avoidance distance for obstacle avoidance is restricted to become smaller. This makes it possible to avoid the obstacle while lowering the risk that the vehicle departs from the lane, even when the border line of the lane is not detected.

Preferably, the vehicle control device of the present invention is configured to allow a driver to select one of plural avoidance modes set to be different from each other in terms of the lateral avoidance distance, and to execute the traveling course correction processing such that, when the border line is detected, the corrected target traveling course is calculated according to the selected avoidance mode, and, when the border line is not detected, the corrected target traveling course is calculated according to one of the avoidance modes which is smallest in terms of the lateral avoidance distance, irrespective of the selected avoidance mode.

According to this feature, when the border line of the lane is not detected, the corrected target traveling course is calculated based on one of the avoidance modes which is smallest in terms of the lateral avoidance distance with respect to the target traveling course, irrespective of which of the avoidance modes is selected. This makes it possible to further lower the risk of lane departure.

Preferably, the vehicle control device of the present invention is configured to execute the restriction processing in the traveling course correction processing, when one of two border lines of the lane on both sides of the obstacle is not detected, wherein the one border line is located on a side on which there is the target traveling course.

According to this feature, when one border line on the side on which there is a possibility of lane departure is not detected during obstacle avoidance, the lateral avoidance distance is restricted to become smaller, irrespective of whether or not the other border line on the side on which there is no possibility of lane departure is detectable. This makes it possible to avoid the obstacle while adequately lowing the risk that the vehicle departs from the lane. On the other hand, when the one border line on the side on which there is a possibility of lane departure is detected during obstacle avoidance, it is possible to reliably prevent lane departure, based on the detection.

Preferably, the vehicle control device of the present invention is configured to execute the traveling course correction processing, such that, when a preceding vehicle is detected, the corrected target traveling course is set to allow the vehicle to follow the preceding vehicle, without executing the restriction processing.

According to this feature, when a preceding vehicle is detected, the vehicle is controlled to follow the preceding vehicle, so that it is possible to avoid the obstacle in the same manner as that of the preceding vehicle and reliably avoid lane departure.

Preferably, the vehicle control device of the present invention is configured to, when there is an obstacle in the lane, prohibit a lateral movement of the vehicle based on manipulation of a steering wheel by a driver of the vehicle.

According to this feature, as long as an obstacle is detected even when a steering intervention is made by the driver, the lateral movement of the vehicle is prohibited, so that it is possible to suppress the risk of lane departure and the risk of collision against the obstacle.

Effect of Invention

The present invention can provide a vehicle control device capable of suppressing lane departure during obstacle avoidance, even in the situation where a border line of a traveling lane is undetectable.

BRIEF DESCRIPTION OF DRAWINGS

FIG. 2 is an explanatory diagram showing a relationship between a driving support mode and a target traveling course, in this embodiment.

DESCRIPTION OF EMBODIMENTS

Figure 1:
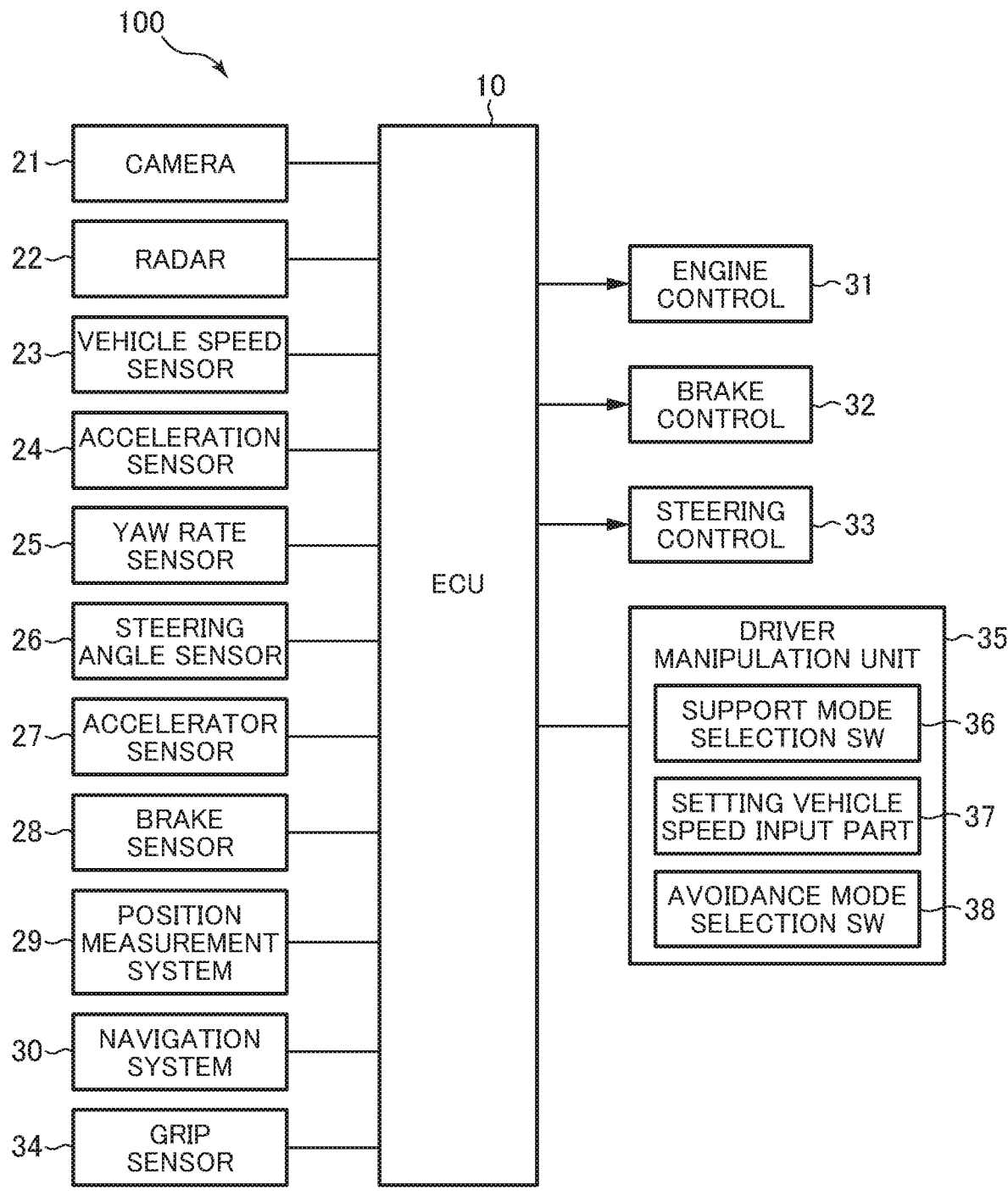
FIG. 1 is a configuration diagram of a vehicle control system according to one embodiment of the present invention.

With reference to the accompanying drawings, a vehicle control system according to one embodiments of the present invention will now be described. First of all, the configuration of the vehicle control system will be described with reference to FIG. 1. FIG. 1 is a configuration diagram of the vehicle control system.

The vehicle control system 100 according to this embodiment is configured to provide different drive support controls to a vehicle 1 (see FIG. 3, etc.) in accordance with plural driving support modes, respectively. A driver can select a desired one of the plural driving support modes.

As shown in FIG. 1, the vehicle control system 100 is equipped in the vehicle 1, and comprises a vehicle control device (ECU) 10, plural sensors and switches, plural control sub-systems, and a driver manipulation unit 35 for allowing user input regarding the driving support modes. The plural sensors and switches include: a vehicle-mounted camera 21; a millimeter-wave radar 22; plural behavior sensors (a vehicle speed sensor 23, an acceleration sensor 24, and a yaw rate sensor 25) and plural behavior switches (a steering angle sensor 26, an accelerator sensor 27, a brake sensor 28, and a grip sensor 34) each for detecting the behavior of the vehicle 1, a position measurement system 29, and a navigation system 30. Further, the plural control sub-systems include an engine control system 31, a brake control system 32 and a steering control system 33.

The driver manipulation unit 35 is provided in a passenger compartment of the vehicle 1 such that it can be manipulated by the driver, and comprises: a mode selection switch 36 for selecting a desired driving support mode from the plural driving support modes; a setting vehicle speed input part 37 for inputting a setting vehicle speed in accordance with the selected driving support mode; and an avoidance mode selection switch 38 for selecting one of plural avoidance modes with respect to an obstacle. In response to manipulation of the mode selection switch 36 by the driver, a driving support mode selection signal according to the selected driving support mode is output. Further, in response to manipulation of the setting vehicle speed input part 37 by the driver, a setting vehicle speed signal is output. Further, in response to manipulation of the avoidance mode selection switch 38 by the driver, an avoidance mode selection signal is output.

The ECU 10 is composed of a computer comprising a CPU, a memory storing therein various programs, and an input/output device. The ECU 10 is configured to be operable, based on the driving support mode selection signal, the setting vehicle speed signal and the avoidance mode selection signal each received from the driver manipulation unit 35, and signals received from the plural sensors and switches, to output request signals for appropriately operating an engine system, a brake system and a steering system, respectively, to the engine control system 31, the brake control system 32 and the steering control system 33.

The vehicle-mounted camera 21 is operable to take images around the vehicle 1 and output image data about the taken images. The ECU 10 is operable to identify an object (e.g., a vehicle, a pedestrian, a road, a demarcation line (a white road line or a yellow road line), a traffic light, a traffic sign, a stop line, an intersection, an obstacle or the like) based on the image data. Alternatively or additionally, the ECU 10 may be configured to acquire information regarding such an object from outside via an in-vehicle communication device through the use of the transportation infrastructure, inter-vehicle communication or the like.

The millimeter-wave radar 22 is a measurement device for measuring the position and speed of the object (particularly, a preceding vehicle, a parked vehicle, a pedestrian, or other obstacles), and is operable to transmit a radio wave (transmitted wave) forwardly with respect to the vehicle 1 and receive a reflected wave produced as a result of reflection of the transmitted wave by the object. Then, the millimeter-wave radar 22 is operable, based on the transmitted wave and the received wave, to measure a distance between the vehicle 1 and the object, i.e., a vehicle-object distance, (e.g., inter-vehicle distance) and/or a relative speed of the object with respect to the vehicle 1. In this embodiment, instead of the millimeter-wave radar 22, a laser radar, an ultrasonic sensor or the like may be used to measure the vehicle-object distance and/or the relative speed. Further, such a position and speed measurement device may be composed using a plurality of other sensors.

The vehicle speed sensor 23 is operable to detect an absolute speed of the vehicle 1.

The accelerator sensor 24 is operable to detect an acceleration (a longitudinal acceleration/deceleration in a longitudinal (forward-rearward) direction, and a lateral acceleration in a lateral (width) direction) of the vehicle 1.

The yaw rate sensor 25 is operable to detect a yaw rate of the vehicle 1.

The steering angle sensor 26 is operable to detect a turning angle (steering angle) of a steering wheel of the vehicle 1.

The accelerator sensor 27 is operable to detect a depression amount of an accelerator pedal.

The brake sensor 28 is operable to detect a depression amount of a brake pedal.

The grip sensor 34 is operable to detect a steering wheel grip force by the driver.

The position measurement system 29 is composed of a GPS system and/or a gyro system, and is operable to detect the position of the vehicle 1 (current vehicle position information).

The navigation system 30 stores therein map information, and is operable to provide the map information to the ECU 10. Then, the ECU 10 is operable, based on the map information and the current vehicle position information, to identify a road, an intersection, a traffic light, a building and others existing around the vehicle 1 (particularly, ahead of the vehicle 1 in a travelling direction of the vehicle 1). The map information may be stored in the ECU 10.

The engine control system 31 comprises a controller for controlling an engine of the vehicle 1. The ECU 10 is operable, when there is a need to accelerate or decelerate the vehicle 1, to output, to the engine control system 31, an engine output change request signal for requesting to change an engine output.

The brake control system 32 comprises a controller for controlling a braking device of the vehicle 1. The ECU 10 is operable, when there is a need to decelerate the vehicle 1, to output, to the brake control system 32, a braking request signal for requesting to generate a braking force to be applied to the vehicle 1.

The steering control system 33 comprises a controller for controlling a steering device of the vehicle 1. The ECU 10 is operable, when there is a need to change the travelling direction of the vehicle 1, to output, to the steering control system 33, a steering direction change request signal for requesting to change a steering direction.

Next, the driving support modes in the vehicle control system 100 according to this embodiment will be described. In this embodiment, the driving support modes consist of four modes (a preceding vehicle following mode, an automatic speed control mode, a speed limiting mode, and a basic control mode).

The preceding vehicle following mode is a mode in which the vehicle 1 is basically controlled to travel following a preceding vehicle, while maintaining a given inter-vehicle distance between the vehicle 1 and the preceding vehicle, and involves automatic steering control, automatic speed control (engine control and/or brake control), automatic obstacle avoidance control (the speed control and the steering control) to be executed by the vehicle control system 100.

In the preceding vehicle following mode, the steering control and the speed control are performed in different manners, depending on detectability of opposed lane edges (border lines), and the presence or absence of a preceding vehicle. Here, the term "opposed lane edges" means opposed border lines (which comprise a demarcation line such as a white road line, a road edge, an edge stone, a median strip, and a guardrail) of a lane along which the vehicle 1 is traveling, i.e., boundaries with respect to a neighboring lane and sidewalk, or the like. The ECU 10 is operable, when serving as a traveling road edge detection part, to detect the opposed lane edges from the image data about the images taken by the vehicle-mounted camera 21. Alternatively, the ECU 10 may be configured to detect the opposed lane edges from the map information of the navigation system 30. However, for example, in a situation where a demarcation line is faded, or there is no demarcation line, or reading of the image data from the vehicle-mounted camera 21 is bad, there is a possibility of failing to detect the opposed lane edges.

As above, in this embodiment, the ECU 10 is configured to serve as the traveling road edge detection part. Alternatively, the vehicle-mounted camera 21 may be configured to detect the opposed lane edges to serve as the traveling road edge detection part, or may be configured to detect the opposed lane edges in cooperation with the ECU 10 to serve as the traveling road edge detection part.

Further, in this embodiment, the ECU 10 is operable, when serving as a preceding vehicle detection part, to detect a preceding vehicle, based on the image data from the vehicle-mounted camera 21, and the measurement data from the millimeter-wave radar 22. Specifically, the ECU 10 is operable to detect a second vehicle which is traveling ahead of the vehicle 1, as a preceding vehicle, based on the image data from the vehicle-mounted camera 21.

Further, in this embodiment, the ECU 10 is operable, when the inter-vehicle distance between the vehicle 1 and the second vehicle is determined to be equal to or less than a given value (e.g., 400 to 500 m), based on the measurement data from the millimeter-wave radar 22, to detect the second vehicle as a preceding vehicle.

As above, in this embodiment, the ECU 10 is configured to serve as the preceding vehicle detection part. Alternatively, the vehicle-mounted camera 21 may be configured to detect a second vehicle which is traveling ahead of the vehicle 1, as the preceding vehicle detection part, or the preceding vehicle detection part may be composed of not only the ECU 10 but also the vehicle-mounted camera 21 and the millimeter-wave radar 22.

In the case where the opposed lane edges are detected, the steering control is performed such that the vehicle 1 is steered to travel along approximately the middle of the lane, and the speed control is performed such that the vehicle 1 maintains a setup vehicle speed (constant speed) preliminarily set by the driver through the use of the setting vehicle speed input part 37 or by the system 100 based on given processing. Here, when the setup vehicle speed is greater than a limited vehicle speed (i.e., a speed limit designated by a speed sign or determined according to the curvature of a curve), priority is given to the limited vehicle speed, so that the vehicle speed of the vehicle 1 is limited to the limited vehicle speed. The speed limit to be determined according to the curvature of a curve is calculated by a given calculation formula, wherein it is set to a lower value as the curvature of the curve becomes larger (a curvature radius of the curve becomes smaller).

Further, when the setup vehicle speed of the vehicle 1 is greater than the vehicle speed of a preceding vehicle, the speed control is performed such that the vehicle 1 follows the preceding vehicle while maintaining an inter-vehicle distance appropriate to a follow-up vehicle speed. Then, when the preceding vehicle being followed by the vehicle 1 disappears from ahead of the vehicle 1 due to lane change or the like, the speed control is performed such that the vehicle 1 maintains the setup vehicle speed, again.

On the other hand, in a case where the opposed lane edges are not detected, and there is a preceding vehicle, the steering control is performed such that the vehicle 1 follows a traveling trajectory of the preceding vehicle, and the speed control is performed such that the vehicle 1 follows the speed on the traveling trajectory of the preceding vehicle.

Further, in a case where the opposed lane edges are not detected, and there is not any preceding vehicle (it is unable to detect a demarcation line or the like and follow any preceding vehicle), it is unable to determine a traveling position of the vehicle 1 on a traveling road. In this case, the driver manually controls vehicle steering and vehicle speed by manipulating the steering wheel, and the accelerator pedal and/or brake pedal so as to maintain or change a current traveling behavior (steering angle, yaw rate, vehicle speed, acceleration/deceleration, or the like) according to the will of the driver.

In the preceding vehicle following mode, the obstacle avoidance control (the speed control and the steering control) as described in detail later is further automatically executed, irrespective of the presence or absence of a preceding vehicle, and the detectability of opposed lane edges.

The automatic speed control mode is a mode in which the speed control is performed such that the vehicle 1 maintains a given setup vehicle speed (constant speed) preliminarily set by the driver or the system 100, and involves the automatic speed control (the engine control and/or the brake control) to be executed by the vehicle control system 100, wherein, basically, the automatic steering control is not performed. In this automatic speed control mode, although the vehicle 1 is controlled to travel to maintain the setup vehicle speed, the driver can increase the vehicle speed beyond the setup vehicle speed by depressing the accelerator pedal. Further, when the driver performs brake manipulation, the highest priority is given to the will of the driver, and therefore the vehicle 1 is decelerated from the setup vehicle speed. In the automatic speed control mode, when the vehicle 1 catches up to a preceding vehicle, the speed control is performed such that the vehicle 1 follows the preceding vehicle while maintaining an inter-vehicle distance appropriate to a follow-up vehicle speed, and then when the preceding vehicle disappears, the speed control is performed such that the follow-up vehicle speed is returned to the setup vehicle speed.

The speed limiting mode is a mode in which the speed control is performed to prevent the vehicle speed of the vehicle 1 from exceeding a speed limit designated by a speed sign, or the setup vehicle speed set by the driver, and involves the automatic speed control (engine control) to be executed by the vehicle control system 100. With respect to the speed limit, the ECU 10 may be configured to subject image data about an image of a speed sign or a speed marking on a road surface taken by the vehicle-mounted camera 21, to image recognition processing, to identify the speed limit, or may be configured to receive information regarding the speed limit from outside via a wireless communication. In the speed limiting mode, even when the driver depresses the accelerator pedal so as to increase the vehicle speed beyond the speed limit, the vehicle speed of the vehicle 1 is increased only up to the speed limit.

The basic control mode is a mode (off mode) in which none of the driving support modes is selected through the driver manipulation unit 35, wherein the automatic steering control and speed control are not executed by the vehicle control system 100. However, the basic control mode is configured to execute an automatic anti-collision control. In this anti-collision control, when the vehicle 1 encounters a situation where it is likely to collide with a preceding vehicle or the like, the brake control is automatically executed to avoid the collision. It should be noted that the anti-collision control is also executed in the preceding vehicle following mode, the automatic speed control mode, and the speed limiting mode.

Further, the obstacle avoidance control (only the speed control, or the speed control and the steering control) is also executed in the automatic speed control mode, the speed limiting mode and the basic control mode.

Next, plural traveling courses to be calculated in the vehicle control system 100 according to this embodiment will be described. In this embodiment, the ECU 10 is configured to calculate first to third traveling courses R1 to R3 temporally repeatedly (e.g., at intervals of 0.1 sec). In this embodiment, the ECU 10 is operable, based on information from the sensors and others, to calculate a traveling course applicable during a given time period (e.g., 2 to 4 sec) from a present time. The traveling course Rx (where x=1, 2, 3) is defined by sets of a target position (Px_k) and a target speed (Vx_k) (where k=0, 1, 2, - - - , n) of the vehicle 1 on the traveling course.

Each of the first to third traveling courses R1 to R3 is calculated based on the shape of a traveling road on which the vehicle 1 is traveling, the traveling trajectory of a preceding vehicle, the traveling behavior of the vehicle 1, and the setup vehicle speed, without taking into account obstacle information regarding an obstacle (including a parked vehicle, a pedestrian and the like) on the traveling road or around the traveling road (i.e., information regarding an obstacle whose situation can vary temporally). As above, in this embodiment, each of the traveling courses is calculated without taking into account the obstacle information, so that it is possible to keep down the overall calculation load for calculating the plural traveling courses.

The first traveling course R1 is set, by a distance corresponding to a given time period, to enable the vehicle 1 to maintain traveling on an ideal course within the traveling lane in conformity to the shape of the traveling lane. Specifically, the first traveling course R1 is set, in a straight section, to enable the vehicle 1 to maintain traveling along approximately the widthwise middle of the lane, and set, in a curve section, to enable the vehicle 1 to travel on an inner side or in-side (on the side of the center of a curvature radius of the curve section) with respect to the widthwise middle of the lane.

The ECU 10 is operable to execute image recognition processing for image data about images around the vehicle 1 taken by the vehicle-mounted camera 21, to detect opposed lane edges. The opposed lane edges comprise a demarcation line (white road line or the like), and a road shoulder, as mentioned above. Further, the ECU 10 is operable, based on the detected opposed lane edges, to calculate a lane width of the lane and the curvature radius in the curve section. Alternatively, the ECU 10 may be configured to acquire the lane width and the curvature radius from the map information of the navigation system 30. Further, the ECU 10 is operable to read, from the image data, a speed limit indicated by a speed sign or on the road surface. Alternatively, the ECU 10 may be configured to acquire the speed limit from outside via a wireless communication, as mentioned above.

With regard to the straight section, the ECU 10 is operable to set a plurality of target positions P1_k of the first traveling course R1 to enable a widthwise middle (e.g., the position of the center of gravity) of the vehicle 1 to pass through the widthwise middle between the opposed lane edges. In this embodiment, the ECU 10 is operable to set the first traveling course R1 to enable the vehicle 1 to travel along the middle of the lane in the straight section, as mentioned above. Alternatively, the ECU 10 may be configured to set the first traveling course R1 while reflecting a driving characteristic (preference or the like) of the driver, such that the first traveling course R1 extends along a line adjacent to the middle of the lane and offset in the width direction by a given shift amount (given distance) with respect to the middle of the lane.

On the other hand, with respect to the curve section, the ECU 10 is operable to maximally set a displacement amount toward the in-side from the widthwise middle position of lane at a longitudinal middle position of the curve section. This displacement amount is calculated based on the curvature radius, the lane width, and a width dimension of the vehicle 1 (prescribed value stored in the memory of the ECU 10). Then, the ECU 10 is operable to set a plurality of target positions P1_$k$ of the first traveling course R1 in such a manner as to smoothly connect the longitudinal middle position of the curve section 5$b$ to the widthwise middle position of the straight section. Here, it should be understood that the first traveling course R1 may also be offset toward the in-side in the straight section at positions just before entering the curve section.

Basically, a target speed V1_$k$ at the target position P1_$k$ of the first traveling course R1 is set to a given setup vehicle speed (constant speed) preliminarily set by the driver through the use of the setting vehicle speed input part 37 of the driver manipulation unit 35 or by the system 100. However, when this setup vehicle speed exceeds the speed limit acquired from a speed sign or the like, or the speed limit determined according to the curvature radius of the curve section, the target speed V1_$k$ at the target position P1_$k$ on the traveling course is limited to a lower one of the two speed limits. Further, the ECU 10 is operable to appropriately correct the target position P1_$k$ and the target speed V1_$k$, according to a current behavior state (i.e., vehicle speed, acceleration/deceleration, yaw rate, steering angle, lateral acceleration, etc.) of the vehicle 1. For example, when a current value of the vehicle speed is largely different from the setup vehicle speed, the target speed is corrected so as to enable the vehicle speed to come close to the setup vehicle speed.

Basically, the first traveling course R1 is used in the situation where the opposed lane edges are detected. Thus, in a situation where the opposed lane edges are not detected, the first traveling course R1 needs not be calculated. However, in preparation for a situation where the first traveling course R1 is erroneously selected even though the opposed lane edges are not detected, the first traveling course R1 may be calculated in the following alternative manner.

In such a situation, the ECU 10 is operable, assuming that the vehicle 1 travels along the middle of the lane, to set virtual opposed lane edges, using the steering angle or yaw rate according to the vehicle speed of the vehicle 1. Then, the ECU 10 is operable, based on the virtually-set opposed lane edges, to calculate the first traveling course to enable the vehicle 1 to travel along the middle of the lane, in the straight section and travel on the in-side of the lane, in the curve section.

The second traveling course R2 is set, by a distance corresponding to a given time period, to enable the vehicle 1 to follow a traveling trajectory of a preceding vehicle 3. The ECU 10 is operable to continuously calculate the position and speed of the preceding vehicle in the lane along which the vehicle 1 is traveling, based on the image data from the vehicle-mounted camera 21, the measuring data from the millimeter-wave radar 22, and the vehicle speed of the vehicle 1 from the vehicle speed sensor 23, and store the calculated position and speed as preceding vehicle trajectory information, and, based on the preceding vehicle trajectory information, to set the traveling trajectory of the preceding vehicle as the second traveling course R2 (sets of a target position P2_$k$ and a target speed V2_$k$).

In this embodiment, the second traveling course R2 is basically calculated in the situation where a preceding vehicle is detected. Thus, in a situation where no preceding vehicle is detected, the second traveling course R2 needs not to be calculated. However, in preparation for a situation where the second traveling course R2 is erroneously selected even though no preceding vehicle is detected, the second traveling course R2 may be calculated in the following alternative manner.

In such a situation, the ECU 10 is operable, assuming that a preceding vehicle is traveling at a position ahead of the vehicle 1 by a given distance according to the vehicle speed of the vehicle 1. Further, assume that this virtual preceding vehicle has the same traveling behavior (vehicle speed, steering angle, yaw rate, etc.) as that of the vehicle 1. Then, the ECU 10 is operable to calculate the second traveling course R2 to follow the virtual preceding vehicle.

The third traveling course R3 is set, by a distance corresponding to a given time period, based on a current driving state of the vehicle 1 by the driver. Specifically, the third traveling course R3 is set based on a position and a speed estimated from a current traveling behavior of the vehicle 1.

The ECU 10 is operable, based on the steering angle, the yaw rate and the lateral acceleration of the vehicle 1, to calculate a target position P3_$k$ of the third traveling course R3 having the distance corresponding to the given time period. However, in the situation where the opposed lane edges are detected, the ECU 10 is operable to correct the target position P3_$k$ so as to prevent the calculated third traveling course R3 from coming close to or intersecting with any of the lane edges.

Further, the ECU 10 is operable, based on current values of the vehicle speed and the acceleration/deceleration of the vehicle 1, to calculate a target speed V3_$k$ of the third traveling course R3 having the distance corresponding to the given time period. Here, when the target speed V3_$k$ exceeds the speed limit acquired from the speed sign S or the like, the target speed V3_$k$ may be corrected so as not to exceed the speed limit.

Next, with reference to FIG. 2, a relationship between the driving support mode and the target traveling course in the vehicle control system 100 according to this embodiment will be described. FIG. 2 is an explanatory diagram showing the relationship between the driving support mode and the target traveling course. In this embodiment, the vehicle control system 100 is configured such that, when the driver manipulates the mode selection switch 36 to select one of the driving support modes, the ECU 10 operates to select one of the first to third traveling courses R1 to R3 according to the measurement data from sensors and others. That is, in this embodiment, even when the driver selects a certain one of the driving support modes, the same traveling course is not always applied, but one of the traveling courses appropriate to a current traveling state is applied.

When the opposed lane edges are detected during the preceding vehicle following mode, the first traveling course is applied, irrespective of the presence or absence of a preceding vehicle. In this case, the setup vehicle speed set through the use of the setting vehicle speed input part 37 is used as the target speed. Here, the expression "the opposed lane edges are detected" means that the opposed lane edges can be determined to substantially continuously exist over the given distance ahead of the vehicle 1 necessary for calculation of the traveling course.

On the other hand, when the opposed lane edges are not detected but a preceding vehicle is detected during the preceding vehicle following mode, the second traveling course is applied. In this case, the target speed is set according to the vehicle speed of the preceding vehicle. Further, when neither the opposed lane edges nor a preceding vehicle is detected during the preceding vehicle following mode, the third traveling course is applied. Thus, in the situation where the preceding vehicle following mode is selected, the target traveling course to be applied is temporally switched among the first to third traveling courses, depending on the presence or absence of a preceding vehicle and the detectability of the opposed lane edges.

Further, during the automatic speed control mode, the third traveling course R3 is applied. In the automatic speed control mode which is a mode in which the speed control is automatically executed, as mentioned above, the setup speed set through the use of the setting vehicle speed input part 37 is used as the target speed. Further, the driver manually controls vehicle steering by manipulating the steering wheel. Thus, although the third traveling course is applied, the vehicle 1 is likely not to travel along the third traveling course, depending on the driver's manipulation (of the steering wheel and/or the brake pedal).

Further, during the speed limiting mode, the third traveling course is also applied. In the speed limiting mode which is a mode in which the speed control is automatically executed, as mentioned above, the target speed is set according to the depression amount of the accelerator pedal by the driver, within the speed limit. Further, the driver manually controls vehicle steering by manipulating the steering wheel. Thus, although the third traveling course is applied, the vehicle 1 is likely not to travel along the third traveling course, depending on the driver's manipulation (of the steering wheel, the brake pedal, and/or the accelerator pedal), as with the automatic speed control mode.

Further, during the basic control mode (off mode), the third traveling course is applied. The basic control mode is basically the same as the speed limiting mode in a state in which no speed limit is set.

Figure 3:
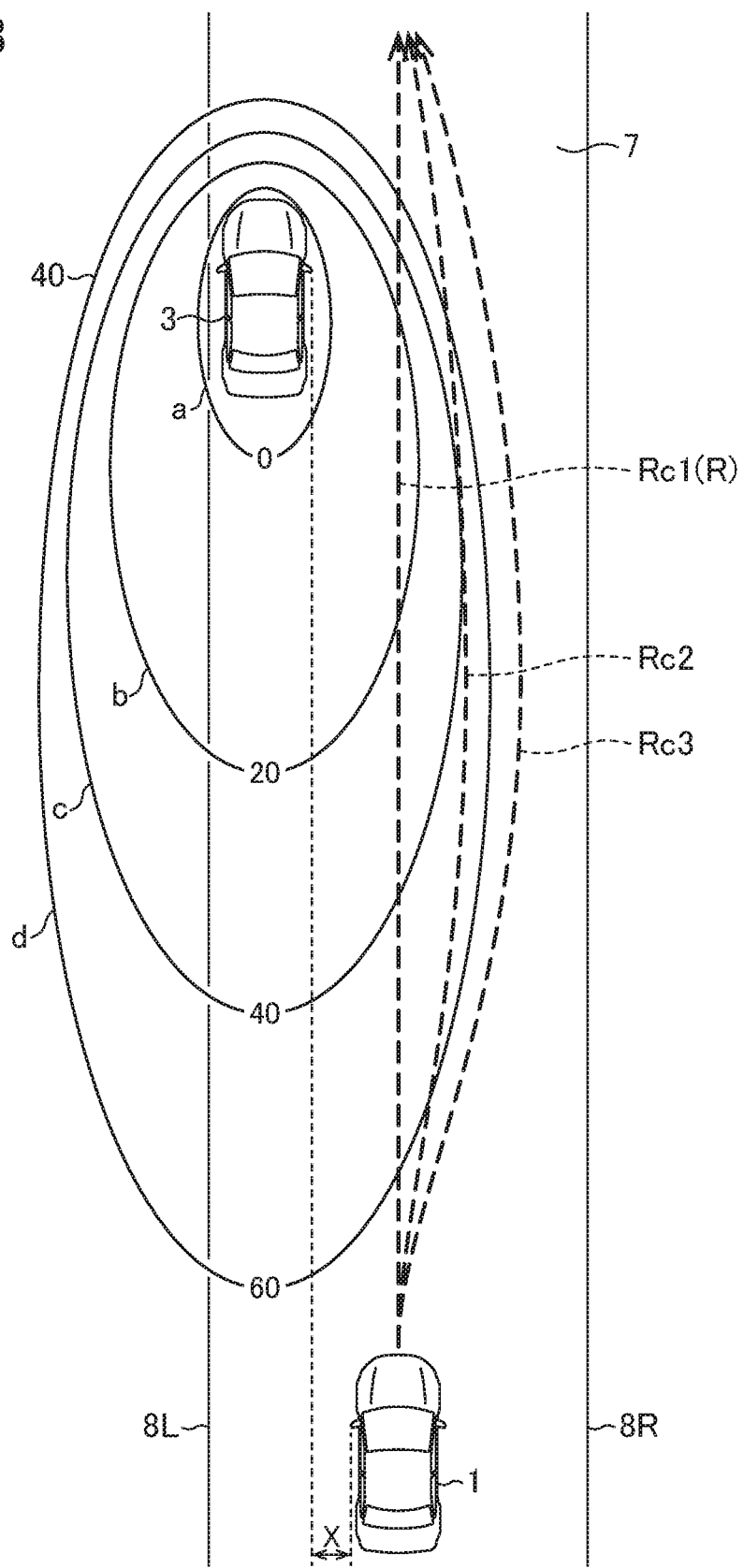
FIG. 3 is an explanatory diagram of obstacle avoidance control in this embodiment.
Figure 4:
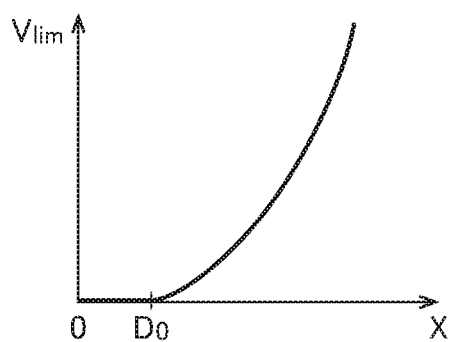
FIG. 4 is an explanatory diagram showing a relationship between an allowable upper limit of a pass-by speed and a clearance between an obstacle and a vehicle in the obstacle avoidance control in this embodiment.

Next, with respect to FIGS. 3 and 4, the obstacle avoidance control and associated traveling course correction processing to be executed by the vehicle control system 100 according to this embodiment will be described. FIG. 3 is an explanatory diagram of the obstacle avoidance control, and FIG. 4 is an explanatory diagram showing a relationship between an allowable upper limit of a pass-by speed and a clearance between an obstacle and a vehicle in the obstacle avoidance control.

In FIG. 3, the vehicle 1 is traveling on a traveling road (lane), and is just about passing another vehicle 3 parked at the side of the traveling road 7 and overtaking the parked vehicle 3. In FIG. 3, assume that the ECU 10 of the vehicle 1 detects a left border line 8L and a right border line 8R of the traveling road 7.

Generally, when passing (or overtaking) an obstacle (e.g., a preceding vehicle, a parked vehicle, or a pedestrian) on or near a road, the driver of the vehicle 1 keeps a given clearance or distance (lateral distance) between the vehicle 1 and the obstacle in the lateral direction orthogonal to the traveling direction of the vehicle 1, and reduces the vehicle speed to a value at which the driver of the vehicle 1 feels safe. Specifically, in order to avoid dangers such as a situation where a preceding vehicle suddenly changes a course, a situation where a pedestrian comes out from a blind spot due to the obstacle, and a situation where a door of a parked vehicle is suddenly opened, the relative speed with respect to the obstacle is set to a lower value as the clearance becomes smaller.

Further, generally, when the vehicle 1 is approaching a preceding vehicle from behind the preceding vehicle, the driver of the vehicle 1 adjusts the vehicle speed (relative speed) according to an inter-vehicle distance (longitudinal distance) along the travelling direction. Specifically, when the inter-vehicle distance is relatively large, an approaching speed (relative speed) is maintained relatively high. However, when the inter-vehicle distance becomes relatively small, the approaching speed is set to a lower value. Subsequently, at a given inter-vehicle distance, the relative speed between the two vehicles is set to zero. This action is the same even when the preceding vehicle is a parked vehicle.

As above, the driver drives the vehicle 1 in such a manner as to avoid dangers while taking into account a relationship between the distance (including the lateral distance and the longitudinal distance) between an obstacle and the vehicle 1, and the relative speed therebetween.

Therefore, in this embodiment, as shown in FIG. 3, the vehicle 1 is configured to set a two-dimensional distribution zone (speed distribution zone 40) defining an allowable upper limit of the relative speed in the travelling direction of the vehicle 1 with respect to an obstacle (such as the parked vehicle 3) detected by the vehicle 1, around the obstacle (over lateral, rear and forward regions around the obstacle) or at least between the obstacle and the vehicle 1. In the speed distribution zone 40, the allowable upper limit $V_{lim}$ of the relative speed is set at each point around the obstacle. In this embodiment, in all the driving support modes, the obstacle avoidance control is executed to prevent the relative speed of the vehicle 1 with respect to the obstacle from exceeding the allowable upper limit $V_{lim}$ in the speed distribution zone 40.

As can be understood from FIG. 3, in the speed distribution zone 40, the allowable upper limit of the relative speed is set such that it becomes smaller as the lateral distance and the longitudinal distance from the obstacle become smaller (as the vehicle 1 approaches the obstacle more closely). In FIG. 3, for the sake of facilitating understanding, four constant relative speed lines each connecting the same allowable upper limits are shown. In this embodiment, the constant relative speed lines a, b, c, d correspond, respectively, to four lines on which the allowable upper limit $V_{lim}$ is 0 km/h, 20 km/h, 40 km/h and 60 km/h.

Here, the speed distribution zone 40 does not necessarily have to be set over the entire circumference of the obstacle, but may be set at least one (in FIG. 3, right side) of opposite lateral sides of the obstacle on which there is the vehicle 1. Further, although FIG. 3 shows the speed distribution zone 40 such that it also covers a region in which the vehicle 1 does not travel (outside the traveling road 7), the speed distribution zone 40 may be set only on the traveling road 7. Further, although FIG. 3 shows the speed distribution zone 40 defining an allowable upper limit of up to 60 km/h, the speed distribution zone 40 may be set to define a larger relative speed, in consideration of passing with respect to an oncoming vehicle which is traveling in an opposite lane.

As shown in FIG. 4, when the vehicle 1 is traveling at a certain absolute speed, the allowable upper limit $V_{lim}$ set in the lateral direction of the obstacle is kept at zero when the clearance X is less than $D_0$ (safe distance), and then quadratically increases when the clearance X becomes equal to or greater than $D_0$ ($V_{lim}=k(X-D_0)^2$, where $X \geq D_0$). That is, when the clearance X is less than $D_0$, the relative speed of the vehicle 1 becomes zero so as to ensure safety. On the other hand, when the clearance X is equal to or greater than $D_0$, the vehicle 1 is allowed to pass the obstacle at a larger relative speed as the clearance becomes larger.

In the example shown in FIG. 4, the allowable upper limit $V_{lim}$ in the lateral direction of the obstacle is defined as follows: $V_{lim}=f(X)=k(X-D_0)^2$. In this formula, k denotes a gain coefficient related to the degree of change of $V_{lim}$ with respect to X, and is set depending on a type of obstacle or the like. Similarly, $D_0$ is set depending on a type of obstacle or the like.

In this embodiment, $V_{lim}$ includes a safe distance, and is defined as a quadratic function of X, as mentioned above. Alternatively, $V_{lim}$ needs not include a safe distance, and may be defined as another function (e.g., a linear function). Further, the allowable upper limit $V_{lim}$ has been described about a region thereof in the lateral direction of the obstacle with reference to FIG. 4, it can be set in the remaining region in all radial directions of the obstacle including the longitudinal direction, in the same manner. In such a case, the coefficient k and the safe distance $D_0$ may be set depending on a direction from the obstacle.

The speed distribution zone 40 can be set based on various parameters. Examples of the parameter may include the relative speed between the vehicle 1 and an obstacle, the type of obstacle, the traveling direction of the vehicle 1, a moving direction and a moving speed of the obstacle, the length of the obstacle, and the absolute speed of the vehicle 1. That is, based on these parameters, the coefficient k and the safe distance $D_0$ can be selected.

In this embodiment, the obstacle includes a vehicle, a pedestrian, a bicycle, a cliff, a trench, a hole, a fallen object, and a motionless object (a fixed object or structure disposed on a road). The vehicle can be classified into a passenger vehicle, a truck, and a motorcycle. The pedestrian can be classified into an adult, a child and a group.

Further, FIG. 3 shows one speed distribution zone in a situation where there is one obstacle. Differently, in a situation where there are plural obstacles in adjacent relation, plural speed distribution zones will overlap each other. Thus, in such an overlapping part, the constant relative speed line may be set by preferentially selecting one of two lines having a smaller allowable upper limit while excluding the other, or by smoothly connecting two approximately elliptical shapes, instead of the approximately elliptical-shaped constant relative speed line as shown in FIG. 3.

As shown in FIG. 3, when the vehicle 1 is traveling on the traveling road 7, the ECU 10 of the vehicle 1 operates to detect an obstacle (parked vehicle 3) based on the image data from the vehicle-mounted camera 21. At this moment, the type of obstacle (in this example, a vehicle or a pedestrian) is identified.

Further, the ECU 10 operates to calculate the position and the relative speed of the obstacle (parked vehicle 3) with respect to the vehicle 1 and absolute speed of the obstacle, based on the measurement data from the millimeter-wave radar 22 and the vehicle speed data from the vehicle speed sensor 23. Here, the position of the obstacle includes a y-directional position (longitudinal distance) along the traveling direction of the vehicle 1, and an x-directional position (lateral distance) along the lateral direction orthogonal to the traveling direction. As the relative speed, a relative speed contained in the measurement data may be directly used, or a component of velocity along the traveling direction may be calculated from the measurement data. Further, although a component of velocity orthogonal to the travelling direction does not necessarily have to be calculated, it may be estimated from plural pieces of measurement data and/or plural pieces of image data, as needed basis.

The ECU 10 operates to set the speed distribution zone 40 with respect to each of one or more detected obstacles (in FIG. 3, the parked vehicle 3). Then, the ECU 10 operates to perform the obstacle avoidance control to prevent the vehicle speed of the vehicle 1 from exceeding the allowable upper limit $V_{lim}$ in the speed distribution zone 40. For this purpose, along with the obstacle avoidance control, the ECU 10 operates to correct the target traveling course applied according to the driving support mode selected by the driver.

Specifically, in a situation where, if the vehicle 1 travels along the target traveling course, the target speed exceeds the allowable upper limit defined in the speed distribution zone 40, at a certain target position, the target traveling course R is corrected by the traveling course correction processing, according to each of the avoidance modes (a straight line priority mode, an intermediate mode, a speed priority mode, etc.) selected through the use of the avoidance mode selection switch 38. Corrected target traveling courses Rc (Rc1 to Rc3) to be calculated according to the avoidance modes are set to be different from each other in terms of a lateral avoidance distance with respect to the target traveling course R before the correction.

When there is a preceding vehicle, this preceding vehicle is also driven to travel while avoiding the obstacle (parked vehicle). Thus, when there is a preceding vehicle during the preceding vehicle following mode, it is assumed that the vehicle 1 can also safely avoid the obstacle by traveling along the selected target traveling course (second traveling course). Thus, the ECU 10 may be configured not to execute the traveling course correction processing, when there is a preceding vehicle during the preceding vehicle following mode.

The straight line priority mode is a mode in which the target speed is reduced without changing the target positions (course Rc1 in FIG. 3). The speed priority mode is a mode in which the target position is changed without changing the target speed, i.e., the target position is changed to be set on a detour course so as to prevent the target speed (or the setup vehicle speed) from exceeding the allowable upper limit (course Rc3 in FIG. 3). The intermediate mode is a mode in which both the target position and the target speed are changed, wherein a corrected target position of the intermediate mode is located between respective corrected target positions of the straight line priority mode and the speed priority mode, and a corrected target speed of the intermediate mode is a value intermediate between respective corrected target speeds of the straight line priority mode and the speed priority mode (course Rc2 in FIG. 3).

However, during any of the avoidance modes, the traveling course correction processing is executed to prevent collision with the obstacle and departure from the lane. Thus, when there is the risk of collision with the obstacle (parked vehicle 3) during the straight line priority mode, the target position is also changed such that a lateral movement for avoiding the obstacle is minimized. Further, when there is the risk of departure from the lane 7 during the straight line priority mode, the corrected target position is set to prevent the lane departure, and the corrected target speed is set such that a decrease in speed from the target speed is minimized.

For example, FIG. 3 shows a case where the calculated target traveling course R is a course set such that the vehicle 1 travels along a widthwise middle position (target position) of the traveling road 7 at 60 km/h (target speed). In this case, the parked vehicle 3 as the obstacle exists ahead of the vehicle 1. However, in a step of calculating the target traveling course R, this obstacle is not taken into account to reduce a calculation load, as mentioned above.

When the vehicle 1 travels along the target traveling course R, it will cut across the constant relative speed lines d, c, b, b, c, d of the speed distribution zone 40, in this order. That is, the vehicle 1 being traveling at 60 km/h enters a region inside the constant relative speed line d (allowable upper limit $V_{lim}$=60 km/h). Thus, the ECU 10 operates to correct the target traveling course R so as to restrict the target speed at each target position of the target traveling course R to the allowable upper limit $V_{lim}$, or less, thereby forming the corrected target traveling course Rc1. That is, in the corrected target traveling course Rc1, as the vehicle 1 approaches the parked vehicle 3 more closely, the target speed is reduced to become equal to or less than the allowable upper limit $V_{lim}$, at each target position, i.e., gradually reduced to less than 20 km/h, and then, as the vehicle 1 travels away from the parked vehicle 3, the target speed is gradually increased to 60 km/h as the original speed.

The corrected target traveling course Rc3 to be calculated during the speed priority mode is a course set such that the vehicle 1 travels outside the constant relative speed line d (which corresponds to a relative speed of 60 km/h), so as to allow the vehicle 1 to travel without changing the target speed (60 km/h) of the target traveling course R. The ECU 10 operates, as long as there is no risk of the lane departure, to correct the target traveling course R such that the target position is changed to a point on or outside the constant relative speed line d, while maintain the target speed of the target traveling course R, thereby forming the corrected target traveling course Rc3. Thus, the target speed of the corrected target traveling course Rc3 is maintained at 60 km/h as the target speed of the target traveling course R.

The corrected target traveling course Rc2 to be calculated during the intermediate mode is a course set by changing both the target position and the target speed of the target traveling course R. In the corrected target traveling course Rc2, the target speed is not maintained at 60 km/h, specifically, the target speed is gradually reduced to 40 km/h as the vehicle 1 approaches the parked vehicle 3, and then gradually increased to 60 km/h as the original speed, as the vehicle 1 travels away from the parked vehicle 3. The corrected target traveling course Rc2 can be formed such that the target position and the target speed thereof satisfy a given condition. For example, the given condition is that each of the longitudinal acceleration/deceleration and the lateral acceleration of the vehicle 1 is equal to or less than a given value, or that there is no departure from the traveling road 7 toward a neighboring lane.

The obstacle avoidance control is also applied in a situation where, in the preceding vehicle following mode, the automatic speed control mode, the speed limiting mode and the basic control mode, the vehicle 1 catches up with a preceding vehicle which is traveling in the same lane. Specifically, as the vehicle 1 approaches the preceding vehicle, the vehicle speed of the vehicle 1 is restricted such that the relative speed is reduced in conformity to the allowable upper limit $V_{lim}$ of the speed distribution zone 40. Then, at a position of the constant relative speed line a on which the relative speed between the vehicle 1 and the preceding vehicle becomes zero, the vehicle 1 follows the preceding vehicle while maintaining a given inter-vehicle distance.

Here, assume that, during the preceding vehicle following mode, the driver manipulates the steering wheel. In this case, when it is determined that there is no risk of collision with the obstacle and departure from the lane, the ECU 10 operates to allow the lateral movement of the vehicle 1 based on the manipulation of the steering wheel, irrespective of the presence or absence of the opposed lane edges, the detectability of a preceding vehicle, and the currently selected avoidance mode. For example, when the steering wheel is manipulated to cause the vehicle 1 to be moved in a direction away from the obstacle, or when a lateral distance from the vehicle 1 to the border line of the lane is equal to or greater than a given value, it is determined that there is no risk of collision with the obstacle and the lane departure.

On the other hand, when the ECU 10 operates to determine that there is a risk of collision with the obstacle and the lane departure due to the manipulation of the steering wheel, the ECU 10 operates to add an assist torque in a direction opposite to a manipulation direction of the steering wheel to restrict the manipulation of the steering wheel.

Figure 5:
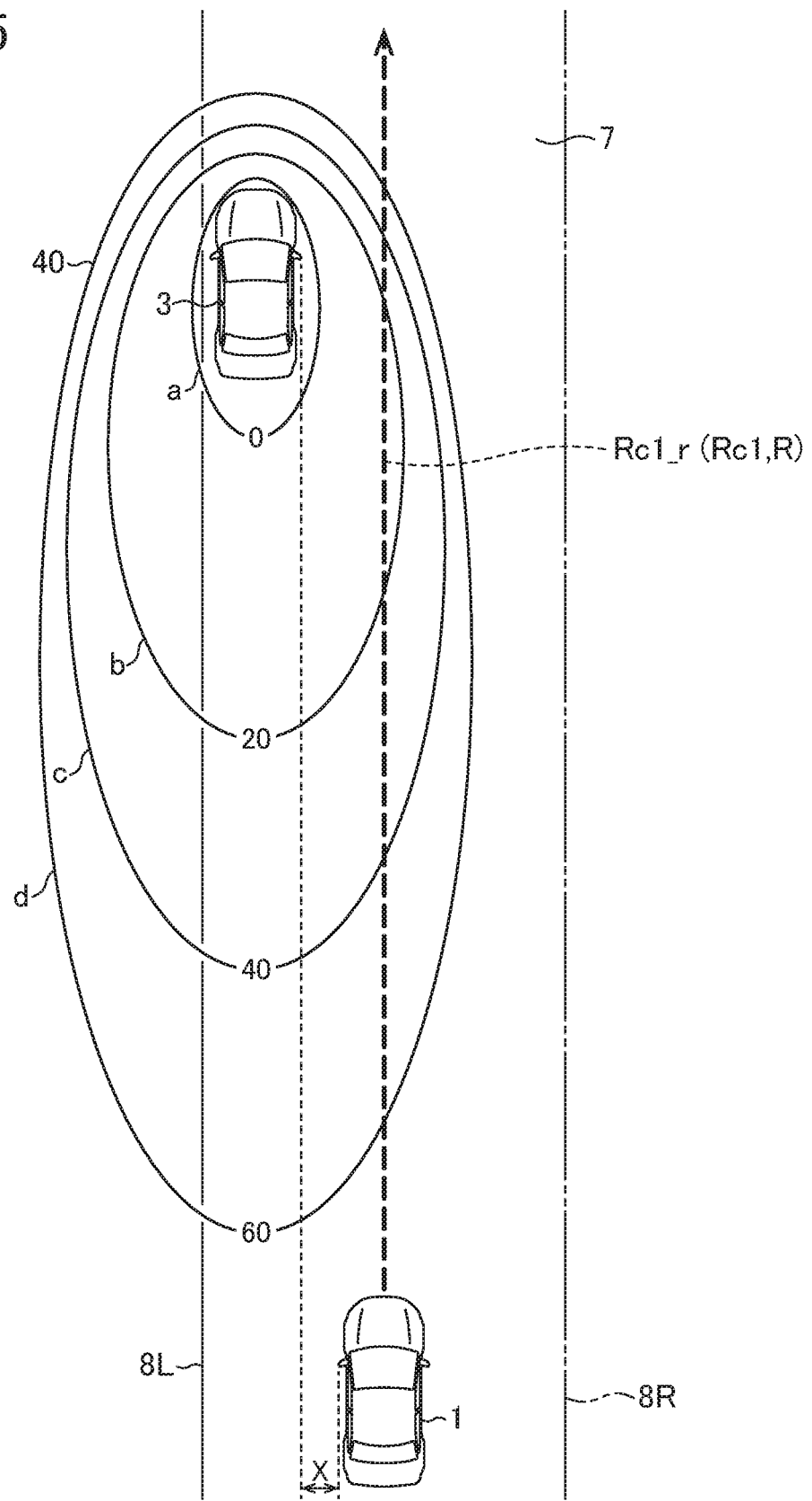
FIG. 5 is an explanatory diagram of a corrected target traveling course after restriction processing during a straight line priority mode, in this embodiment.
Figure 6:
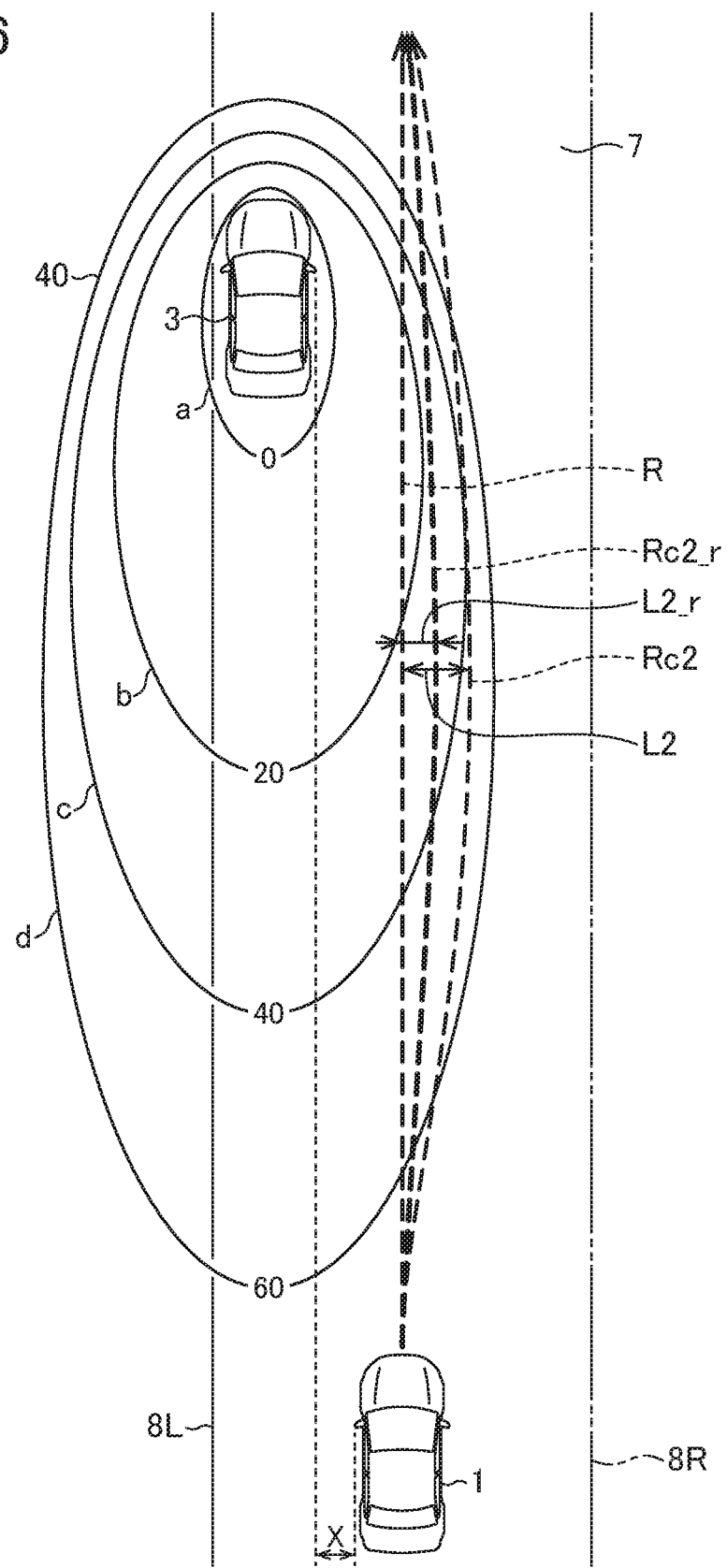
FIG. 6 is an explanatory diagram of a corrected target traveling course after the restriction processing during an intermediate mode, in this embodiment.
Figure 7:
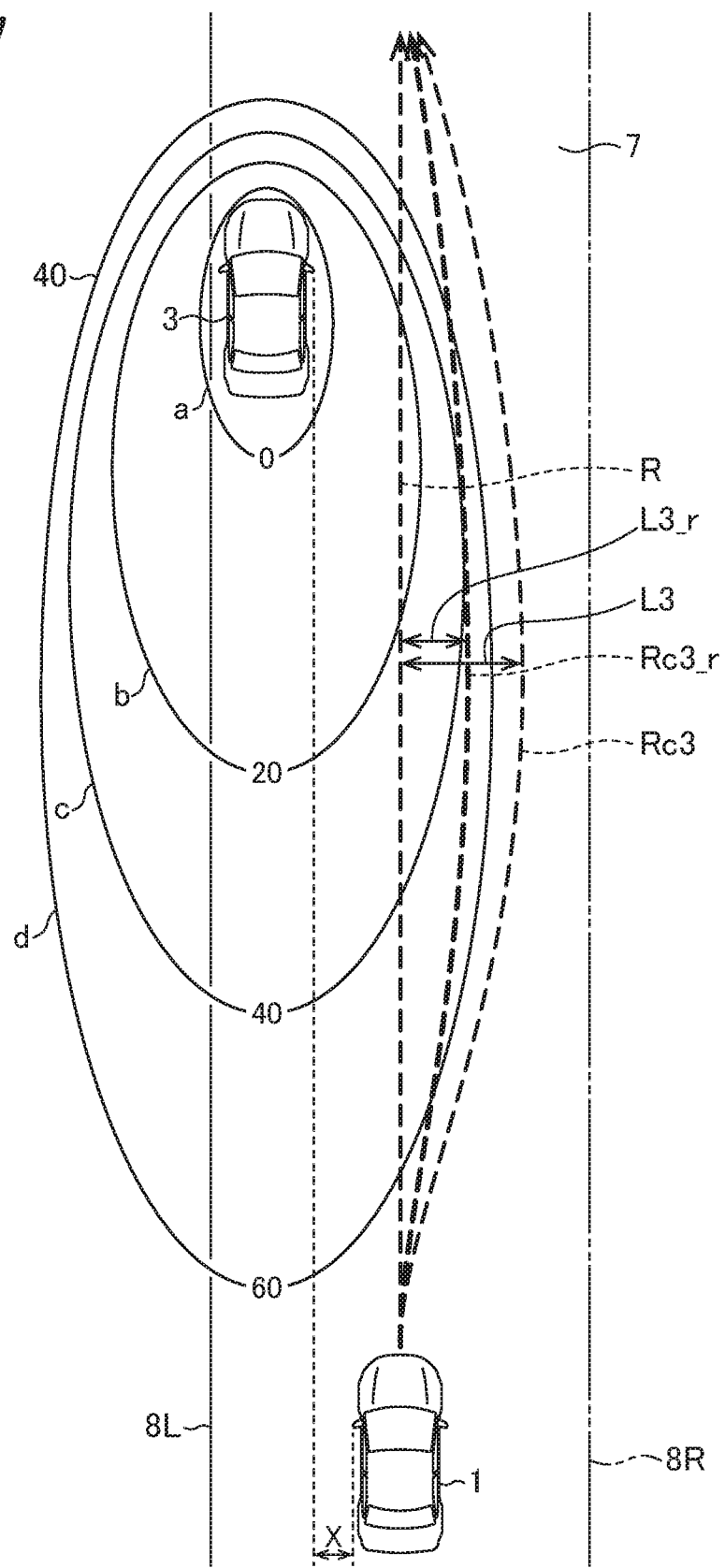
FIG. 7 is an explanatory diagram of a corrected target traveling course after the restriction processing during a speed priority mode, in this embodiment.

Next, with reference to FIGS. 5 to 7, restriction processing included in the traveling course correction processing to be executed in the vehicle control system 100 according to this embodiment will be described. FIG. 5 is an explanatory diagram of a corrected target traveling course after the restriction processing during the straight line priority mode. FIG. 6 is an explanatory diagram of a corrected target traveling course after the restriction processing during the intermediate mode, and FIG. 7 is an explanatory diagram of a corrected target traveling course after the restriction processing during the speed priority mode.

In this embodiment, when a border line of the traveling lane is not detected, the restriction processing is executed in the traveling course correction processing. In FIG. 3, during overtaking, the vehicle 1 travels on the right side of the parked vehicle 3. Thus, a corrected target traveling course to be calculated through the traveling course correction processing so as to avoid collision with the parked vehicle 3 is located laterally (rightwardly) with respect to the target traveling course. Here, in FIGS. 5 to 7, assume that the ECU 10 of the vehicle 1 fails to detect at least one of opposed boarder lines of the traveling road 7, wherein the one boarder line is a border line 8R located on the right side of the vehicle 1. Therefore, if the undetected border line 8R is left out of consideration, the corrected target traveling course is likely to actually cross the border line 8R.

Therefore, in the restriction processing, with a view to preventing such lane departure, the corrected target traveling course (Rc1 to Rc3) described with reference to FIG. 3 is further corrected to calculate a restricted target traveling course (Rc1_r to Rc3_r). That is, a corrected target traveling course (FIGS. 5 to 7) calculated when a border line is not detected is restricted to be smaller in terms of a lateral movement distance (lateral avoidance distance) with respect to the target traveling course R, as compared to a corrected target traveling course (FIG. 3) calculated when the border line is detected.

When a border line (at least the border line 8R) is not detected during the straight line priority mode, the restricted target traveling course Rc1_r is calculated, as shown in FIG. 5. In the example illustrated in FIG. 5, the target position on the target traveling course R is located away from the parked vehicle 3 by at least a safe distance or more, so that the corrected target traveling course Rc1 is not displaced laterally with respect to the target traveling course R. However, a (corrected) target speed of the corrected target traveling course Rc1 is re-calculated so as not to exceed the allowable upper limit $V_{lim}$, of the speed distribution zone 40. Thus, in this example, the restricted target traveling course Rc1_r needs not change its lateral position with respect to the corrected target traveling course Rc1.

On the other hand, in a case where, in order to avoid collision with the parked vehicle 3, the corrected target traveling course Rc1 is displaced laterally with respect to the target traveling course R by a given avoidance distance, the restricted target traveling course Rc1_r is restricted to be smaller in terms of the lateral avoidance distance of each target position than the corrected target traveling course Rc1. For example, the restricted avoidance distance of the restricted target traveling course Rc1_r can be set to a value obtained by multiplying the avoidance distance of the corrected target traveling course Rc1 with respect to the target traveling course R at each corresponding target position, by a coefficient c (0<c<1), on the condition that the restricted target traveling course Rc1_r is spaced apart from the parked vehicle 3 by the safe distance or more. Alternatively, the avoidance distance at each target position may be restricted to a given value (e.g., 50 cm) or less (the avoidance distance the given value). In this case, when the avoidance distance is not greater than the given value, the corrected target traveling course Rc1 is not changed to the restricted target traveling course Rc1_r.

On the other hand, when a border line (at least the border line 8R) is not detected during the intermediate mode, the restricted target traveling course Rc2_r is calculated, as shown in FIG. 6. In the example illustrated in FIG. 6, the corrected target traveling course Rc2 is displaced laterally with respect to the target traveling course R by up to an avoidance distance L2. Upon execution of the restriction processing, the restricted target traveling course Rc2_r is set by displacing the target traveling course R laterally by up to a restricted avoidance distance L2_r (=c·L2). In this example, the coefficient c is 0.5. Alternatively, the coefficient c may be arbitrarily set in the range of greater than 0 to less than 1 (0<c<1). Further, in conjunction with setting of a (restricted) target position, a (restricted) target speed corresponding to each (restricted) target position is re-calculated so as not to exceed the allowable upper limit $V_{lim}$ of the speed distribution zone 40. Alternatively, the avoidance distance at each target position may be restricted to a given value (e.g., 50 cm) or less (the avoidance distance the given value), as with the straight line priority mode. In this case, when the avoidance distance is not greater than the given value, the corrected target traveling course Rc2 is not changed to the restricted target traveling course Rc2_r.

On the other hand, when a border line (at least the border line 8R) is not detected during the speed priority mode, the restricted target traveling course Rc3_r is calculated, as shown in FIG. 7. In the example illustrated in FIG. 7, the corrected target traveling course Rc3 is displaced laterally with respect to the target traveling course R by up to an avoidance distance L3. Upon execution of the restriction processing, the restricted target traveling course Rc3_r is set by displacing the target traveling course R laterally by up to a restricted avoidance distance L3_r (=c·L3). The coefficient c is the same as that in the intermediate mode. Further, in conjunction with setting of a (restricted) target position, a (restricted) target speed corresponding to each (restricted) target position is re-calculated so as not to exceed the allowable upper limit $V_{lim}$ of the speed distribution zone 40. Thus, in a case where the border line is not detected even when the speed priority mode is selected, the (restricted) target speed of the restricted target traveling course Rc3_r include a value less than a current value of the vehicle speed of the vehicle 1. Alternatively, the avoidance distance at each target position may be restricted to a given value (e.g., 50 cm) or less (the avoidance distance the given value), as with the straight line priority mode. In this case, when the avoidance distance is not greater than the given value, the corrected target traveling course Rc3 is not changed to the restricted target traveling course Rc3_r.

The above coefficient c may be the same value in the three avoidance modes, or may be different values in the three avoidance modes. Further, the given value defining the upper limit of the avoidance distance may be the same value (e.g. 50 cm) in the three avoidance modes, or may be different values in the three avoidance modes (e.g., the straight line priority mode: 30 cm, the intermediate mode: 40 cm, and the speed priority mode: 50 cm).

Here, assume that, during the preceding vehicle following mode, the driver manipulates the steering wheel. In this case, when it is determined that there is no risk of collision with the obstacle, the ECU 10 operates to allow the lateral movement of the vehicle 1 based on the manipulation of the steering wheel, irrespective of the presence or absence of the opposed lane edges, the detectability of a preceding vehicle, and the currently selected avoidance mode. For example, when the steering wheel is manipulated to cause the vehicle 1 to be moved in a direction away from the obstacle, it is determined that there is no risk of collision with the obstacle and the lane departure. However, the ECU 10 may be configured to invalidate manipulation of the steering wheel in either direction without making such determinations, to prohibit the lateral movement of the vehicle 1 based on the manipulation of the steering wheel.

On the other hand, when it is determined that there is the risk of collision with the obstacle and departure from the lane, the ECU 10 operates to add an assist torque in a direction opposite to a manipulation direction of the steering wheel to restrict the manipulation of the steering wheel.

Figure 8:
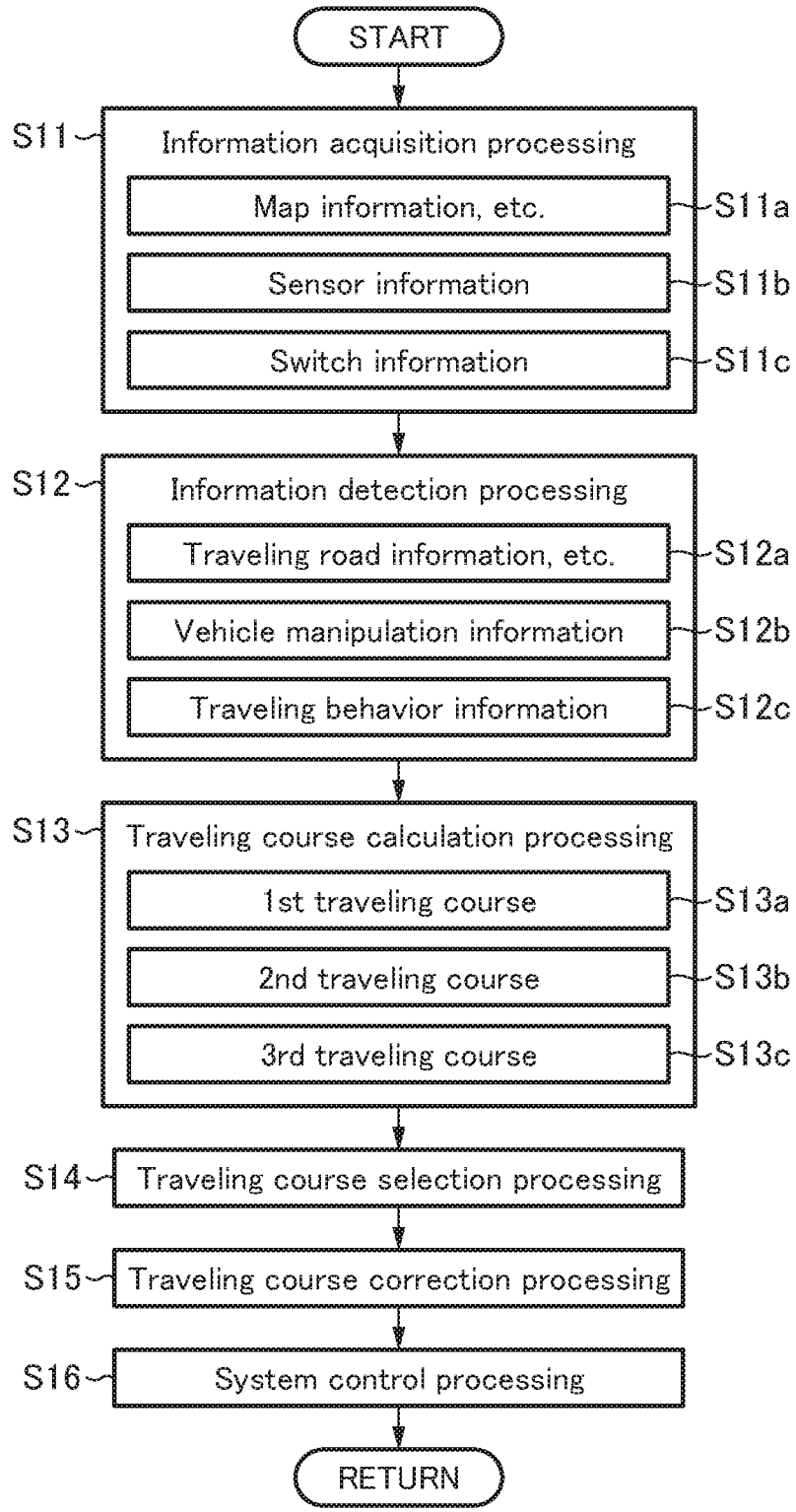
FIG. 8 is a processing flow of driving support control in this embodiment.
Figure 9:
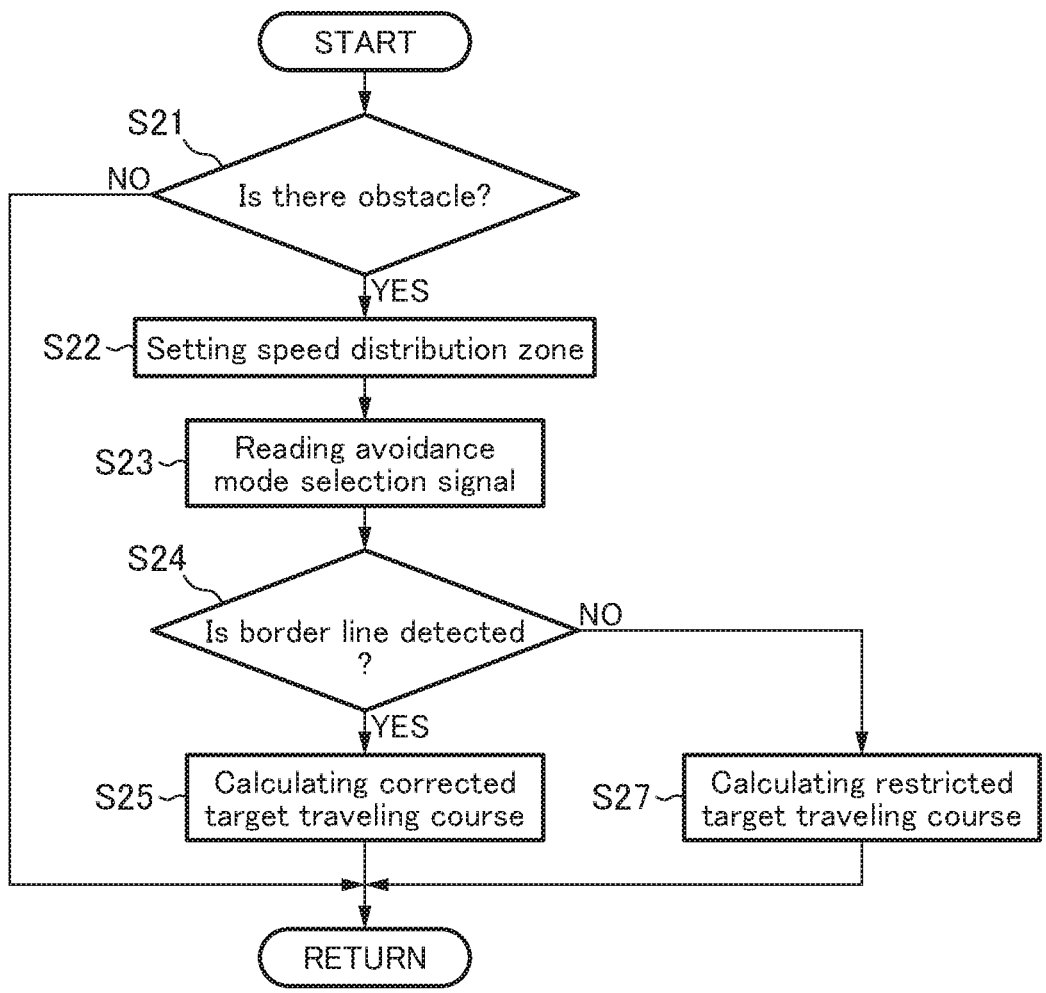
FIG. 9 is a processing flow of traveling course correction processing in this embodiment.

Next, with reference to FIGS. 8 and 9, a processing flow of driving support control in the vehicle control system 100 according to this embodiment will be described. FIG. 8 is the processing flow of the driving support control, and FIG. 9 is a processing flow of traveling course correction processing.

The ECU 10 operates to repeatedly execute the processing flow in FIG. 8 at intervals of a given time period (e.g., 0.1 seconds). First of all, the ECU 10 operates to execute information acquisition processing (S11). In the information acquisition processing, the ECU 10 operates to: acquire the current vehicle position information and the map information, from the position measurement system 29 and the navigation system 30 (S11a); acquire sensor information from the vehicle-mounted camera 21, the millimeter-wave radar 22, the vehicle speed sensor 23, the acceleration sensor 24, the yaw rate sensor 25, the driver manipulation unit 35 and others (S11b); and acquire switch information from the steering angle sensor 26, the accelerator sensor 27, the brake sensor 28, the grip sensor 34 and others (S11c).

Subsequently, the ECU 10 operates to execute given information detection processing (S12), using a variety of information acquired in the information acquisition processing (S11). In the information detection processing, the ECU 10 operates to detect, from the current vehicle position information, the map information and the sensor information, traveling road information regarding a shape of a traveling road around and ahead of the vehicle 1 (the presence or absence of a straight section and a curve section, the length of each of the sections, the curvature radius of the curve section, a lane width, the positions of opposed lane edges, the number of lanes, the presence or absence of an intersection, a speed limit determined by the curvature of a curve, etc.), traveling regulation information (speed limit, red light, etc.), the obstacle information (the presence or absence, the position, the speed, etc., of a preceding vehicle or other obstacle), the preceding vehicle trajectory information (the position and the vehicle speed of a preceding vehicle) (S12a).

Further, the ECU 10 operates to: detect, from the switch information, vehicle manipulation information (the steering angle, the accelerator depression amount, the brake pedal depression amount, the steering wheel grip force, etc.) (S12b); and detect, from the switch information and the sensor information, traveling behavior information regarding the behavior of the vehicle 1 (the vehicle speed, the acceleration/deceleration, the lateral acceleration, the yaw rate, etc.) (S12c).

Subsequently, the ECU 10 operates to execute the traveling course calculation processing, based on information obtained by calculation (S13). In the traveling course calculation processing, a first traveling course calculation processing (S13a), a second traveling course calculation processing (S13b) and a third traveling course calculation processing (S13c) are executed in the aforementioned manner.

Specifically, in the first traveling course calculation processing, the ECU 10 operates to calculate, based on the setup vehicle speed, the opposed lane edges, the lane width, the speed limit, the vehicle speed, the acceleration/deceleration, the yaw rate, the steering angle, the lateral acceleration, etc., the traveling course R1 (target position $P1\_k$ and target speed $V1\_k$) by a distance corresponding to a given time period (e.g., 2 to 4 sec), so as to enable the vehicle 1 to travel along approximately the middle of a lane in a straight section, and travel on the in-side of a curve in a curve section to have a larger turning radius, wherein a lowest one of the setup vehicle speed, a speed limit designated by a traffic sign, and a speed limit determined by the curvature of the curve is set as the maximum speed.

In the second traveling course calculation processing, the ECU 10 operates to calculate, based on the preceding vehicle trajectory information (position and speed) of the preceding vehicle acquired from the sensor information, etc., the traveling course R2 by a distance corresponding to a given time period, so as to enable to the vehicle 1 to follow the behavior (position and speed) of the preceding vehicle, while maintaining a given inter-vehicle distance between the preceding vehicle and the vehicle 1, i.e., behind the preceding vehicle by a time necessary to travel over the inter-vehicle distance.

In the third traveling course calculation processing, the ECU 10 operates to calculate the traveling course R3 from a current behavior of the vehicle 1 estimated based on the vehicle manipulation information, the traveling behavior information, etc., by a distance corresponding to a given time period.

Subsequently, the ECU 10 operates to execute the traveling course selection processing for selecting one target traveling course from the calculated three traveling courses (S14). In this processing, the ECU 10 operates to select the one target traveling course, based on the driving support mode selected by the driver through the use of the mode selection switch 36, detectability of the opposed lane edges, and the presence or absence of a preceding vehicle (see FIG. 2), as described above.

Further, the ECU 10 operates to execute the traveling course correction processing for correcting the selected target traveling course (S15). In this traveling course correction processing, the ECU 10 operates to correct the selected target traveling course, based on the obstacle information (e.g., information about the parked vehicle 3 illustrated in FIG. 3), as described above with reference to FIGS. 3 and 5 to 7. In this traveling course correction processing, basically, the selected traveling course is corrected to enable the vehicle 1 to avoid an obstacle or follow a preceding vehicle by the speed control and/or steering control in accordance with a selected one of the driving support modes.

Subsequently, the ECU 10 operates to output, according to the selected driving support mode, a request signal to a concerned control sub-system (the engine control system 31, the brake control system 32 and/or the steering control system 33) so as to enable the vehicle 1 to travel on the finally calculated traveling course (S16).

Next, with reference to FIG. 9, a detailed processing flow of the traveling course correction processing (S15) in FIG. 8 will be described.

First of all, the ECU 10 operates to determine, based on the obstacle information, whether or not there is an obstacle ahead of the vehicle 1 (S21). When there is no obstacle (S21: NO), the ECU 10 operates to complete one processing cycle without correcting the target traveling course selected in the step S14. On the other hand, when there is an obstacle (S21: YES), the ECU 10 operates to set the speed distribution zone with respect to the detected obstacle (S22), and read the avoidance mode selection signal (S23). The ECU 10 operates to identify the selected avoidance mode.

Subsequently, the ECU 10 operates to determine whether or not border lines on both sides of the traveling lane are detected (S24). In the step S24, only a specific one of the border lines of the lane located on the side on which there is no obstacle (i.e., located on the side on which there is the target traveling course with respect to an obstacle, or located on an avoidance side on which there is the risk that the vehicle 1 departs from the lane) may be selected as a detection target. That is, detectability of the other border line located on the side on which there is an obstacle with respect to the target traveling course (i.e., located on the side on which there is no target traveling course with respect to an obstacle) needs not be determined.

When the specific border line is detected (S24: YES), the ECU 10 operates to calculate the corrected target traveling course (S25), and complete one processing cycle. Specifically, as described with reference to FIG. 3, the ECU 10 operates to calculate the corrected target traveling course by correcting, according to the selected avoidance mode, the target traveling course R selected in the step S14 so as to prevent the target speed of the target traveling course R from exceeding the allowable upper limit. Here, the ECU 10 may be configured to, when there is a preceding vehicle during the preceding vehicle following mode, directly output the target traveling course R (second traveling course) without correcting this target traveling course R, as mentioned above.

On the other hand, when the specific border line is not detected (S24: NO), the ECU 10 operates to calculate the restricted target traveling course (S27), and complete one processing cycle. Specifically, the ECU 10 operates to calculate the restricted target traveling course such that a lateral avoidance distance of the restricted target traveling course is set to become smaller than that of the corrected target traveling course according to the selected avoidance mode, as described with reference to FIGS. 5 to 7. Here, the ECU 10 may be configured to, when there is a preceding vehicle during the preceding vehicle following mode, directly output the target traveling course R (second traveling course) without correcting this target traveling course R, as mentioned above.

Further, the ECU 10 may be configured to calculate, in the step S27, the restricted target traveling course, on the assumption that a selected one of the avoidance modes is the straight line priority mode, irrespective of which of the avoidance modes is selected.

Next, the functions of the vehicle control system according to above embodiment will be described.

The above embodiment relates to a vehicle control device (ECU) 10 for setting a target traveling course R in a lane 7 along which a vehicle 1 is traveling, wherein: the target traveling course R includes a target position and a target vehicle speed; and the vehicle control device 10 is configured to, when there is an obstacle (parked vehicle 3) in the lane 7 (S21: YES), execute traveling course correction processing (S15) of setting, between the obstacle 3 and the vehicle 1, a speed distribution zone 40 defining a distribution of an allowable upper limit $V_{lim}$ of a relative speed of the vehicle 1 with respect to the obstacle 3, and calculating a corrected target traveling course Rc by correcting the target traveling course R so as to prevent the relative speed of the vehicle 1 from exceeding the allowable upper limit $V_{lim}$ and enable the vehicle 1 to avoid the obstacle 3, wherein the traveling course correction processing includes restriction processing (S27) of calculating the corrected target traveling course (restricted target traveling course (Rc1_r to Rc3_r)) such that a lateral avoidance distance (L2_r, L3_r) of the corrected target traveling course with respect to the target traveling course R is set to be smaller when a border line of the lane is not detected (S24: NO) than when the border line of the lane is detected (S24: YES).

In the above embodiment, when a border line of the lane 7 is not detected, the lateral avoidance distance for obstacle avoidance is restricted so as to become smaller. Specifically, in FIG. 6, the maximum avoidance distance is restricted from L2 to L2_r, and in FIG. 7, the maximum avoidance distance is restricted from L3 to L3_r. This makes it possible to avoid the obstacle 3 while lowering the risk that the vehicle departs from the lane, even when the border line of the lane 7 is not detected.

In the above embodiment, the vehicle control device 10 is configured to allow a driver to select one of plural avoidance modes (a straight line priority mode, an intermediate mode and a speed priority mode) set to be different from each other in terms of the lateral avoidance distance, and to execute the traveling course correction processing (S15) such that, when the border line is detected (S24: YES), the corrected target traveling course Rc is calculated according to the selected avoidance mode, and, when the border line is not detected (S24: NO), the corrected target traveling course (restricted target traveling course Rc1_r) is calculated according to one (straight line priority mode) of the avoidance modes which is smallest in terms of the lateral avoidance distance, irrespective of the selected avoidance mode.

According to this feature, when the border line of the lane 7 is not detected, the corrected target traveling course (restricted target traveling course) is calculated based on one (straight line priority mode) of the avoidance modes which is smallest in terms of the lateral avoidance distance with respect to the target traveling course R, irrespective of which of the avoidance modes is selected. This makes it possible to further lower the risk of lane departure.

In the above embodiment, the vehicle control device 10 is configured to execute the restriction processing in the traveling course correction processing (S15), when one (8R) of two border lines (8L, 8R) of the lane 7 on both sides of the obstacle 3 is not detected, wherein the one border line 8R is located on a side on which there is the target traveling course R.

According to this feature, when one border line 8R on the side on which there is a possibility of lane departure is not detected during obstacle avoidance, the lateral avoidance distance is restricted to become smaller, irrespective of whether or not the other border line 8L on the side on which there is no possibility of lane departure is detectable. This makes it possible to avoid the obstacle 3 while adequately lowing the risk that the vehicle 1 departs from the lane 7. On the other hand, when the one border line 8R on the side on which there is a possibility of lane departure is detected during obstacle avoidance, it is possible to reliably prevent lane departure, based on the detection (S25).

In the above embodiment, the vehicle control device 10 is configured to execute the traveling course correction processing (S15), such that, when a preceding vehicle is detected, the corrected target traveling course is set to allow the vehicle 1 to follow the preceding vehicle, without executing the restriction processing (S27). According to this feature, when a preceding vehicle is detected, the vehicle 1 is controlled to follow the preceding vehicle, so that it is possible to avoid the obstacle 3 in the same manner as that of the preceding vehicle and reliably avoid lane departure.

In the above embodiment, the vehicle control device 10 is configured to, when there is an obstacle 3 in the lane 7, prohibit a lateral movement of the vehicle 1 based on manipulation of a steering wheel by a driver of the vehicle 1. According to this feature, as long as an obstacle 3 is detected even when a steering intervention is made by the driver, the lateral movement of the vehicle 1 is prohibited, so that it is possible to suppress the risk of lane departure and the risk of collision against the obstacle 3.

LIST OF REFERENCE SIGNS

1: vehicle
3: parked vehicle (obstacle)
7: lane (traveling road)
8L, 8R: border line
40: speed distribution zone
100: vehicle control system 100
a, b, c, d: constant relative speed line
R: target traveling course
Rc1 to Rc3: corrected target traveling course
Rc1_r to Rc3_r: restricted target traveling course

The invention claimed is:

1. A vehicle control device for setting a target traveling course in a lane along which a vehicle is traveling, wherein:
   the target traveling course includes sets of a target position and a target vehicle speed; and
   the vehicle control device is configured to, when there is an obstacle in the lane, execute traveling course correction processing of setting a speed distribution zone defining a distribution of an allowable upper limit of a relative speed of the vehicle with respect to the obstacle between the obstacle and the vehicle, and calculating a corrected target traveling course by correcting the target traveling course so as to prevent the relative speed of the vehicle from exceeding the allowable upper limit and enable the vehicle to avoid the obstacle,
   wherein the traveling course correction processing includes restriction processing of calculating the corrected target traveling course such that a lateral avoidance distance of the corrected target traveling course with respect to the target traveling course is set to be smaller when a border line of the lane is not detected than when the border line of the lane is detected,
   wherein the vehicle control device is configured to allow a driver to select one of plural avoidance modes set to be different from each other in terms of the lateral avoidance distance, and to execute the traveling course correction processing such that, when the border line is detected, the corrected target traveling course is calculated according to the selected avoidance mode, and, when the border line is not detected, the corrected target traveling course is calculated according to one of the avoidance modes which is smallest in terms of the lateral avoidance distance, irrespective of the selected avoidance mode.

2. The vehicle control device as recited in claim 1, wherein the vehicle control device is configured to execute the restriction processing in the traveling course correction processing, when one of two border lines of the lane on both sides of the obstacle is not detected, wherein the one border line is located on a side on which there is the target traveling course.

3. The vehicle control device as recited in claim 1, wherein the vehicle control device is configured to execute the traveling course correction processing, such that, when a preceding vehicle is detected, the corrected target traveling course is set to allow the vehicle to follow the preceding vehicle, without executing the restriction processing.

4. The vehicle control device as recited in claim 1, wherein the vehicle control device is configured to, when there is an obstacle in the lane, prohibit a lateral movement of the vehicle based on manipulation of a steering wheel by a driver of the vehicle.

\* \* \* \* \*